United States Patent
Biesse (10) Patent No.: US 8,251,458 B2
(45) Date of Patent: Aug. 28, 2012

(54) ANTI-SINK RIM

(76) Inventor: Philippe Biesse, Bellegarde (FR)

( * ) Notice: Subject to any disclaimer, the term of this patent is extended or adjusted under 35 U.S.C. 154(b) by 411 days.

(21) Appl. No.: 11/914,623

(22) PCT Filed: May 12, 2006

(86) PCT No.: PCT/FR2006/001086
§ 371 (c)(1),
(2), (4) Date: Aug. 13, 2008

(87) PCT Pub. No.: WO2006/123044
PCT Pub. Date: Nov. 23, 2006

(65) Prior Publication Data
US 2009/0015058 A1  Jan. 15, 2009

(30) Foreign Application Priority Data
May 17, 2005 (FR) .................... 05 04952

(51) Int. Cl.
*B60B 11/10* (2006.01)
*B60B 15/26* (2006.01)
(52) U.S. Cl. .................. 301/40.2; 301/39.1
(58) Field of Classification Search ............ 301/13.2, 301/36.3, 38.1, 39.1, 40.1, 40.2, 40.3, 40.4, 301/40.6, 42, 43, 44.1; 152/216, 225 R, 152/225 C, 226
See application file for complete search history.

(56) References Cited

U.S. PATENT DOCUMENTS

| | | | | |
|---|---|---|---|---|
| 1,485,837 A * | 3/1924 | Dickey et al. | ............ | 301/40.1 |
| 1,525,439 A * | 2/1925 | Campbell | ............ | 301/41.1 |
| 1,558,864 A * | 10/1925 | Goyette | ............ | 301/38.1 |
| 1,568,937 A * | 1/1926 | Zwalsh | ............ | 301/40.1 |
| 1,712,322 A * | 5/1929 | Bachrach | ............ | 301/38.1 |
| 1,766,393 A * | 6/1930 | Metts | ............ | 301/40.3 |
| 2,130,448 A * | 9/1938 | Signori | ............ | 301/39.1 |
| 2,207,826 A * | 7/1940 | Schmeiser | ............ | 301/40.2 |
| 2,210,451 A * | 8/1940 | Galindo | ............ | 301/40.3 |
| 2,214,023 A * | 9/1940 | Kaura | ............ | 301/39.1 |
| 2,257,543 A * | 9/1941 | Toby | ............ | 301/39.1 |
| 2,336,959 A * | 12/1943 | Redman | ............ | 301/38.1 |
| 3,464,475 A | 9/1969 | Freed | | |
| 3,612,613 A * | 10/1971 | Tricon | ............ | 301/41.1 |
| 3,644,001 A * | 2/1972 | Lavallee | ............ | 301/40.6 |
| 4,305,621 A * | 12/1981 | Snell et al. | ............ | 301/40.2 |
| 4,666,216 A * | 5/1987 | Smith | ............ | 301/40.4 |
| 5,427,398 A * | 6/1995 | Weybrecht | ............ | 280/304.1 |

(Continued)

FOREIGN PATENT DOCUMENTS

BE  414 208 A  3/1936

(Continued)

*Primary Examiner* — Jason Bellinger (57) ABSTRACT

Device used to free a vehicle that is stuck in terrain or to reduce such risk through the use of an additional tread disposed parallel to each wheel of the vehicle. The additional tread can be an air chamber (2 or 10*a* and 10*b*) covered or not with a tire (11) or a band comprising different coupling profiles (13, 14 or 15). The tread is mounted onto an anti-sink rim comprising a conical profile (1.2) and a flange (1.1) centered in and applied against the outer side of the wheel disc by special bolts (6) inserted in respective openings in the flange and rim. The diameter of the system is smaller than that of the wheel to facilitate mounting and to avoid interference with the vehicle body. The conical shape of the rim profile (1.2) lends stiffness and enables the rims to be stacked for reduced storage volume in trunk.

3 Claims, 8 Drawing Sheets

U.S. PATENT DOCUMENTS 5,551,762 A * 9/1996 Roopngam ............... 301/40.3
6,062,651 A * 5/2000 Schaad et al. ............ 301/40.2
6,386,252 B1   5/2002 O'Brian

FOREIGN PATENT DOCUMENTS

| | | | |
|---|---|---|---|
| DE | 19 13 394 A1 | | 9/1970 |
| EP | 402327 A1 | * | 12/1990 |
| FR | 2 659 277 A | | 9/1991 |
| GB | 2028239 A | * | 3/1980 |
| WO | WO 89/00112 A | | 1/1989 |
| WO | WO 8900112 A1 | * | 1/1989 |

* cited by examiner

ANTI-SINK RIM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC

Not Applicable

BACKGROUND OF THE INVENTION

1. Technical Field

The invention relates to a device that is used to free a road or all tracks vehicle that has become stuck in terrain or to reduce the risk of the same. The terrain is made of sand, mud or snow or other soft material that would lead to the sinking of the wheel in the upper layer of soil together with a reduced traction. According to the terrain characteristics and slope of the track, it also helps reduce the difficulties associated with lack of traction of the vehicle on the track material.

2. Background Art

In case a vehicle is stuck, it is known in the vehicle art that one can use special light boards (L×W=2×0.5 m) to function as support and anti skid devices and to be put under the vehicle wheels, use shovels to free the vehicle, or pull the vehicle with a winch and a cable attached to a fix point. To prevent the risk, one can use special tires or snow chains or reduce the tire pressure to increase its contact surface and grip.

Alternatively one can also pull or push the vehicle by means of another vehicle, animals or men. The main drawback of these remedial solutions is that they do not prevent from another problem further down on the track. Their effects are very limited in distance. Further more they require the availability of another vehicle, men or animals for pushing, and there are risks of injuries when pushing or pulling a vehicle, or the tow vehicle can also get stuck.

The preventive solutions such as reducing tire pressure or using special tires are restricted to less critical circumstances. In addition, special tires are optimized for a specific type of track and may not be best suited for the other sections of the road and it is not conceivable to change tires according to each new type of road encountered. It is not advisable to reduce too much the pressure of tubeless tires, and in case it is done, it is necessary to carry a pump to re inflate the tires. The boards are voluminous and their transportation can be envisaged only for specific travel with all track vehicles.

BRIEF SUMMARY OF THE INVENTION

The invention overcomes these drawbacks. It consists of using an additional tread which is disposed parallel to the tread of each existing wheel of the vehicle.

The device includes a light rim centered in relation to the vehicle outer rim edge and applied against the outer surface of the wheel rim.

This light rim consists of a support flange (1.1) which is maintained against the wheel disc by some locking bolts, and which is extended by a rim profile (1.2) which has a conical shape that lends its mechanical stiffness and allows, when not in use, stacking of the rims one inside the other for a minimum storage volume in the trunk of the vehicle.

A tire, the surface of which constitutes the desired additional tread, fills in the space between the anti-sink rim profile and the outside wall of the vehicle tire which constitute its supports. The system outside diameter is smaller than the outside diameter of the existing tire that remains the main carrying element of the vehicle. This difference in outside diameter also allows for an easy mounting of the anti-sink rim on the wheel as son as the a risk of getting stuck appears with the start of sinking of the wheel into the soil, and reduces the risks of contact between the anti-sink rims mounted on the front steering wheels and the body of the vehicle. As shown on the drawings and described more in details, there are different embodiments with variations for tires, rim profiles, centering surfaces and fixation types. According to its material, the tire can be fit on the anti-sink rim before or after mounting on the wheel.

PARTS LIST

1.1: anti-sink rim flange (FIG. 1, 3, 5, 6, 7)
1.2: conical rim profile of anti-sink rim (FIG. 1, 2, 4, 5, 6, 7)
1.2*a*: first segment of anti-sink rim profile (FIG. 3).
1.2*b*: second segment of anti-sink rim profile. (FIG. 3).

Figure 5:
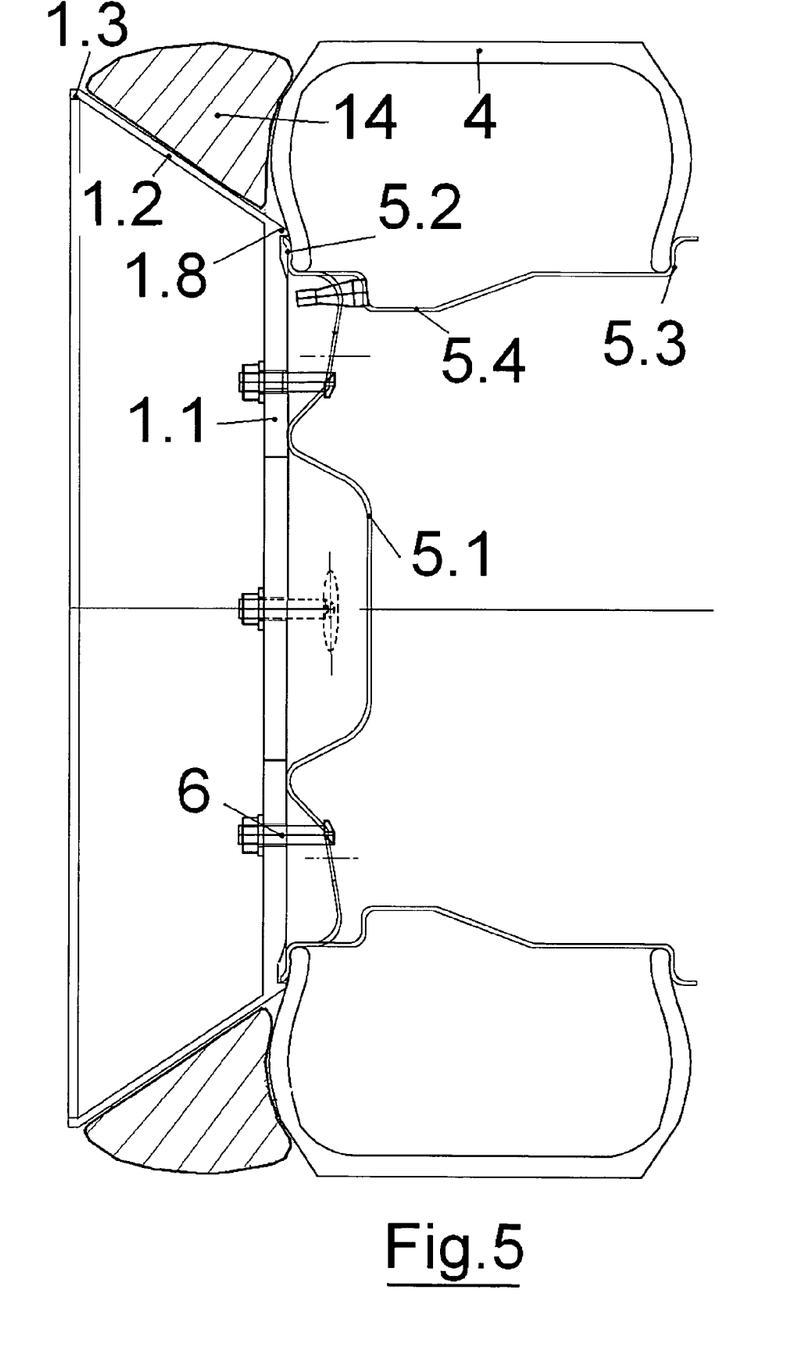
FIG. 5 is a section of a fifth embodiment of the anti-sink rim mounted on a wheel. The tread of this embodiment consists of the surface of compact rubber foam solid tire (14).
Figure 6:
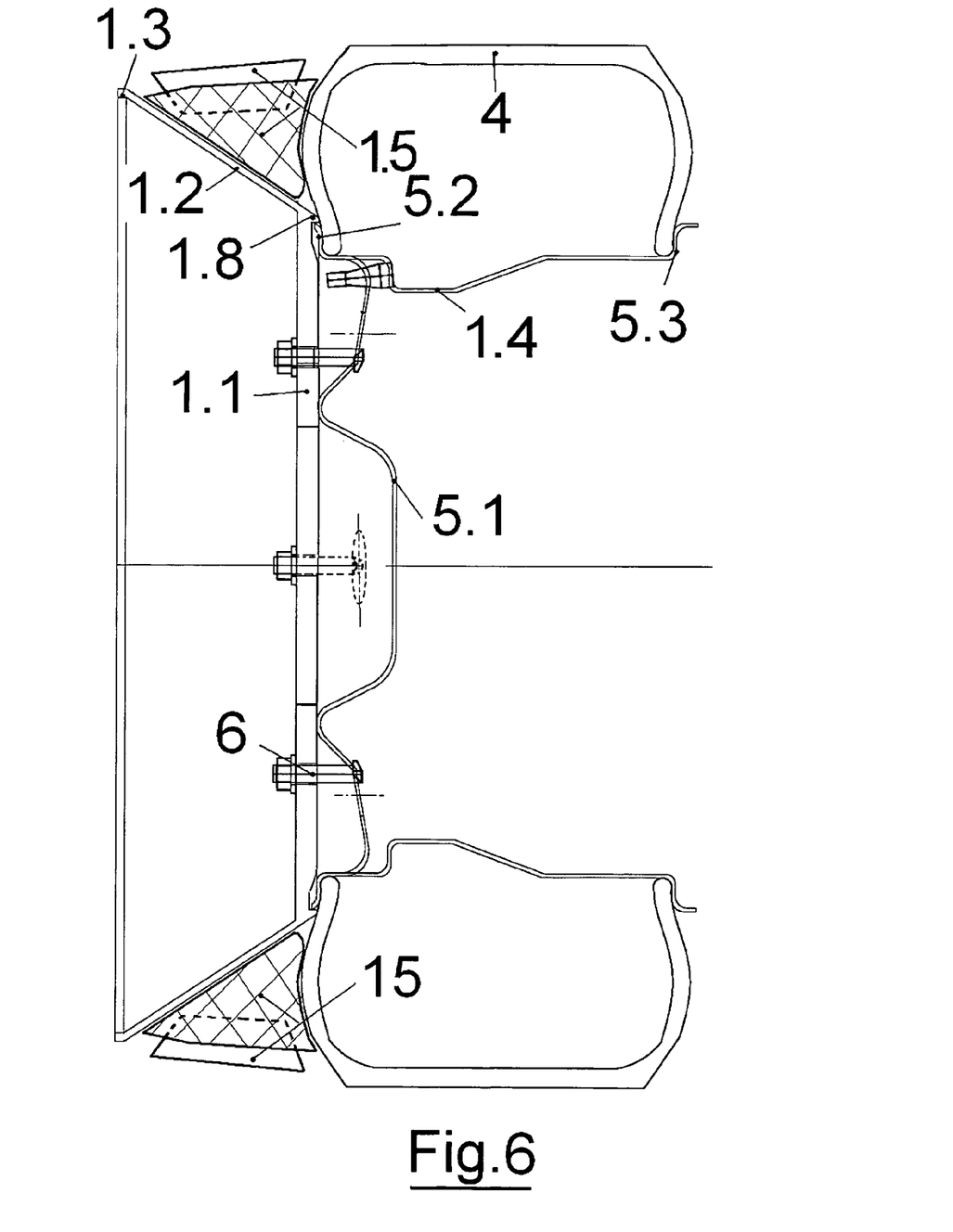
FIG. 6 is a section of a sixth embodiment of the anti-sink rim mounted on a wheel. The tread of this embodiment consists of the paddled surface of a solid tire fitted with blades (15).

1.3: outer reinforcement of the anti-sink rim (FIG. 1, 3, 4, 5, 6).
1.4: outside cylindrical part of the flange (FIG. 1, 2, 3, 6)
1.5: bead wire support on the rim profile (FIG. 2).
1.6: anti-sink rim central part reinforcement (FIG. 4).
1.7: cylindrical centering part of anti-sink rim flange (FIG. 4).
1.8: inside cylindrical groove of anti-sink rim flange (FIG. 5, 6).
1.9: outside shoulder of the rim forming flange and bead seat (FIG. 7).
1.10: extension removable flange for holding the bead wire (FIG. 7)
1.11: extension removable flange rotation stop pin (FIG. 7).
2: thick inflated tube (FIG. 1).
3: inflation valve (FIG. 1, 7)
4: wheel tire (FIG. 1, 3, 4, 5, 6, 7).
5.1: wheel disc (FIG. 1, 3, 4, 5, 6, 7);
5.2 wheel rim edge located on the outside of the vehicle (FIG. 1, 3, 4, 5, 6, 7).
5.3: wheel rim edge located on the vehicle side (FIG. 1, 3, 4, 5, 6, 7).
5.4: cylindrical part of wheel rim with well (FIG. 1, 3, 4, 5, 6, 7).
6: locking bolts (FIG. 1, 2, 3, 4, 5, 6, 7);
6.1: parts of locking bolts, nut, washer, threaded stud (FIG. 1, 8).
6.2: locking bolts hooking system with one pin (FIG. 1, 8).
6.3: locking bolts hooking system with double pin (FIG. 8).
6.4: expansion cone part of locking bolts hooking system (FIG. 8).
6.5: cylindrical split socket part of locking bolts hooking system (FIG. 8).
7: tube protection tape (FIG. 1.2).
8: anti-sink rim light tire (FIG. 2).
9: anti-sink rim inner tube (or air chamber) (FIG. 2).
10a: 1st ring or reinforced tube (FIG. 3).
10b: 2nd ring or reinforced tube (FIG. 3).
11: wide commercial tire mounted on the anti-sink rim (FIG. 7)
12: tube for the wide commercial tire mounted on the anti-sink rim (FIG. 7).
13: anti-sink rim solid tire (13) with cup shape studs (FIG. 4).
14: solid tire made of compact rubber foam (FIG. 5).
15: solid tire with blades on its surface (FIG. 6).

DETAILED DESCRIPTION OF THE INVENTION

Based on the main features revealed in the brief summary of the invention, the following description intends to detail a few embodiments.

Figure 1:
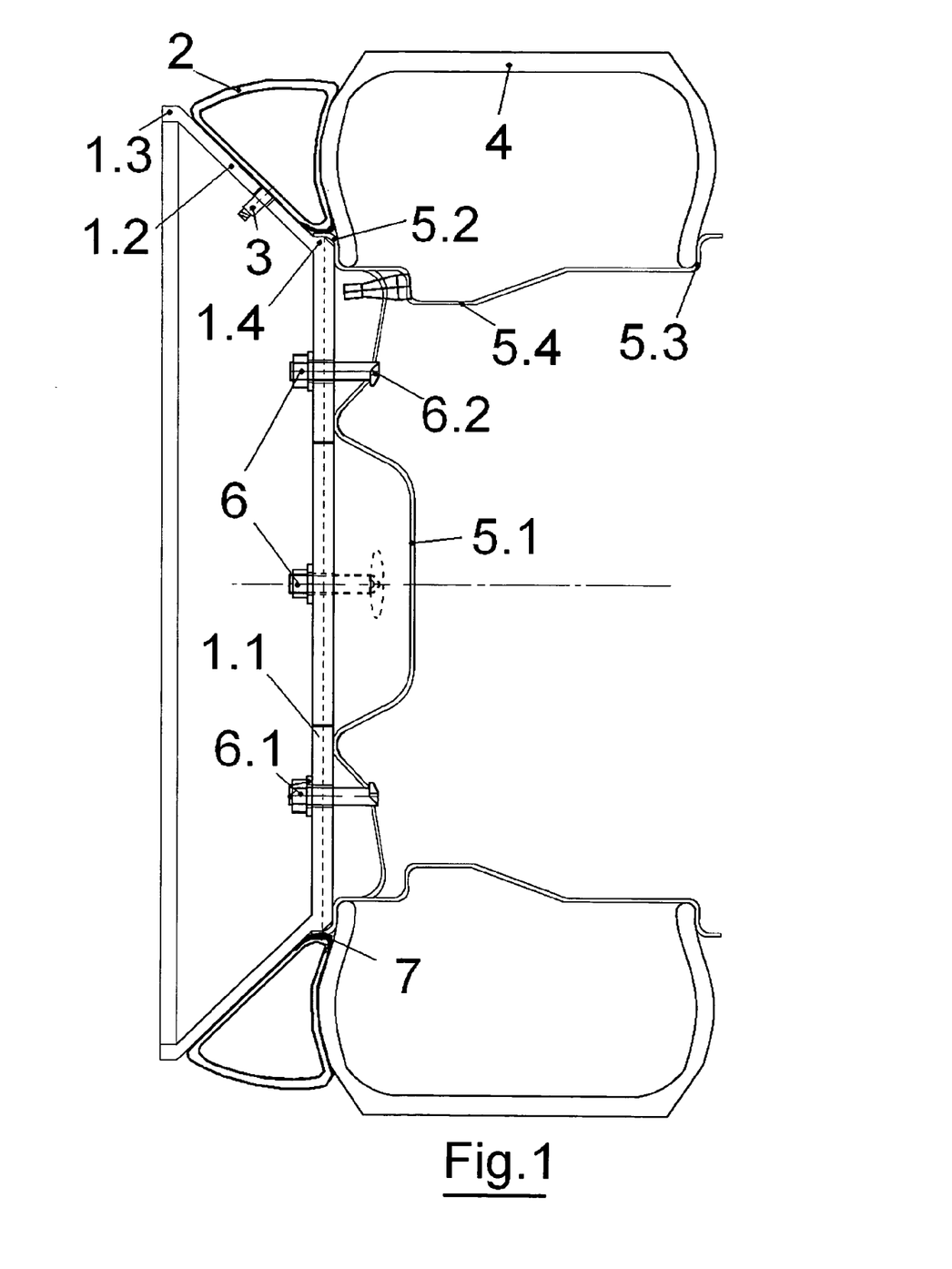
FIG. 1 is a section of one embodiment of the anti-sink rim mounted on a wheel. The tread of this embodiment consists of the outer surface of a thick inflated tube (2).

One first embodiment is illustrated in FIG. 1. The anti-sink rim structure (all items 1) is placed on the wheel. The distal annular surface (1.4) of its flange (1.1) is applied against the wheel rim outer surface at the level of the wheel rim edge (5.2) and the flange outer cylindrical surface (1.4) is centered inside the corner of the wheel rim edge (5.2). The locking bolts (6) which are composed of a nut, a washer and a threaded stud (6.1) extended by a hook (6.2) are inserted and coupled in respective openings in the flange (1.1) and rim (5.1) for insuring contact pressure between the flange (1.1) and the wheel disc. The conical rim profile (1.2) is supported on the flange outer diameter on one side and is reinforced by a ring (1.3) on the other side. The material of the system tire is a thick inflated tube (2) that is supported between the rim profile (1.2) and the existing tire (4) wall located on the outside of the vehicle. The tube is protected from possible damaging contact with the edge of the wheel rim (5.2) by a protective tape (7). The thick tube (2) is inflated through a valve (3) that goes through a small opening in the rim profile (1.2).

Besides the basics shown on this drawing, more details are and a few variations of the first embodiment are discussed here after, some of which are also relevant to the other embodiments.

The structure of this thick tube is made of a mix of rubber, fibers and fabric bandages that bring a stable lateral positioning of the tire, a good grip and keep the tread shape for pressures of around one to two bars. The tube is generally already mounted on the anti-sink rim when the latter is connected to the wheel, however, for the tubes having their non elastic reinforcement layers located only on their outside diameter, it is also possible to mount the tube after the anti sink rim has been mounted on the wheel.

To match the shape of the wheel rim and the holes or openings generally found on the wheel disc, the flange (1.1) is provided with corresponding holes where the locking bolts (6) can be inserted. There will usually be 3, 4, or 5 bolts, matching the number of holes or open spaces in the wheel disc, or corresponding to a sub multiple of this number.

Certain models of commercial rims are designed with very long hollow spaces that don't allow a radial immobilization of the bolts, then, a counter bore machined in the flange of the anti-sink rim (1.1) and having the same diameter as the bolt's washer (6, 6.1) could be used to achieve a radial positioning.

Figure 8:
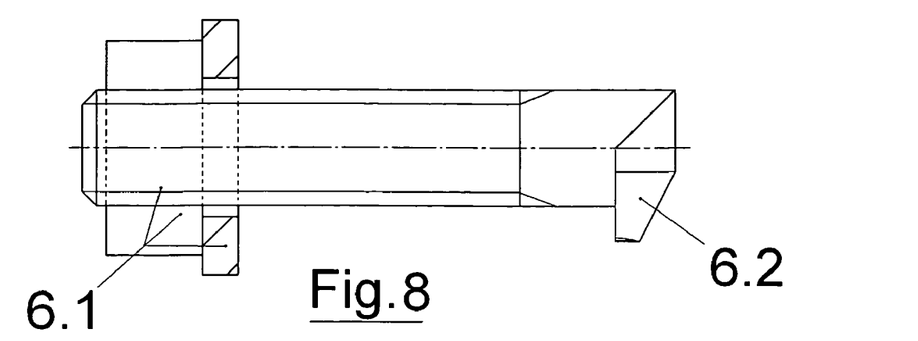
FIG. 8 is an example of locking bolts with an attachment hook with one pin (6.2).
Figure 9:
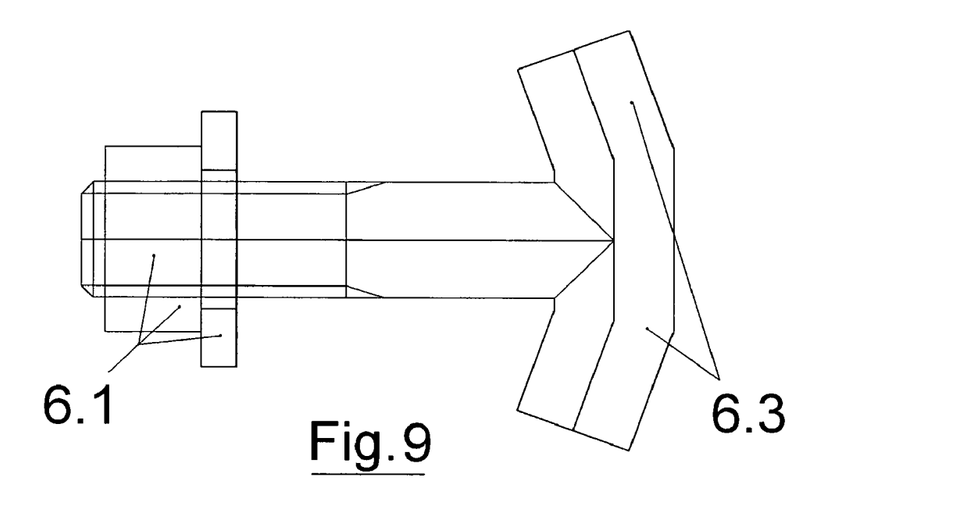
FIG. 9 is a second example of locking bolts with an attachment hook with two pins (6.3).
Figure 10:
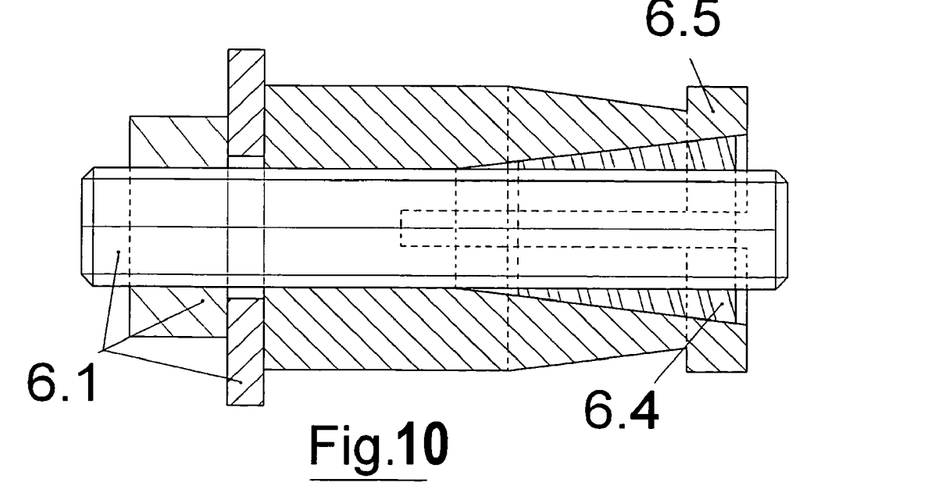
FIG. 10 is a third example of locking bolts with cylindrical split socket (6.5) and an expansion cone (6.4)

In order to cover the requirements of a majority of the commercial rims models, different types of locking bolts (6) are used and consist of a nut, a washer, a threaded stud (6.1) and a hooking systems with one pin (6.2), as shown in FIG. 8, with a double pin (6.3), as shown in FIG. 9, or with a split cylindrical socket (6.5) and expansion cone (6.4), as shown in FIG. 10 or other types are available.

The central part of the flange is generally emptied to reduce weight. It is possible to fold this central part (1.6) to contribute to the stiffening of the system.

According to the commercial rim shape the main surface contact between the anti-sink rim and the wheel rim is done either at the level of the centering diameter (1.4 and 5.2) of the anti sink rim or at the level of a plane contact between the anti sink rim face (1.1) and wheel disc (5.1). The location of the locking bolts in relation to the position of this contact governs the stress on the flange (1.1) and on it's central part (1.6).

In case the car wheel is equipped with a balance weight added on the outer diameter of the rim, it will be necessary to cut and remove from the anti-sink rim both the corresponding part that would otherwise interfere with this weight, and the equivalent mass located diametrically opposite. In that case, the anti-sink rims will be marked so that they will always be mounted on the same matching wheel.

As will be shown in the different figures, the existing wheel tire (4) is located around the wheel rim, part (5.4) and between the rim edges (5.2 and 5.3).

It is also noted that centering and contact surfaces between the anti-sink rim and vehicle wheel depend mainly on the shape of the wheel rim. The surface contact between the anti-sink rim flange (1.1) and the wheel rim can be at the outer edge of the rim (5.2) and the anti-sink rim flange circumference (1.4) as shown in FIGS. 1, 2, 3 and 7, or at the inside corner of the wheel rim edge (5.2) and the anti-sink rim shoulder 1.7 shaped on the flange (1.1) as shown on FIG. 4, or on the outer circumference of the wheel rim and the cylindrical surface of a groove cut in the flange thickness (1.8) as shown on FIGS. 5 and 6.

Figure 2:
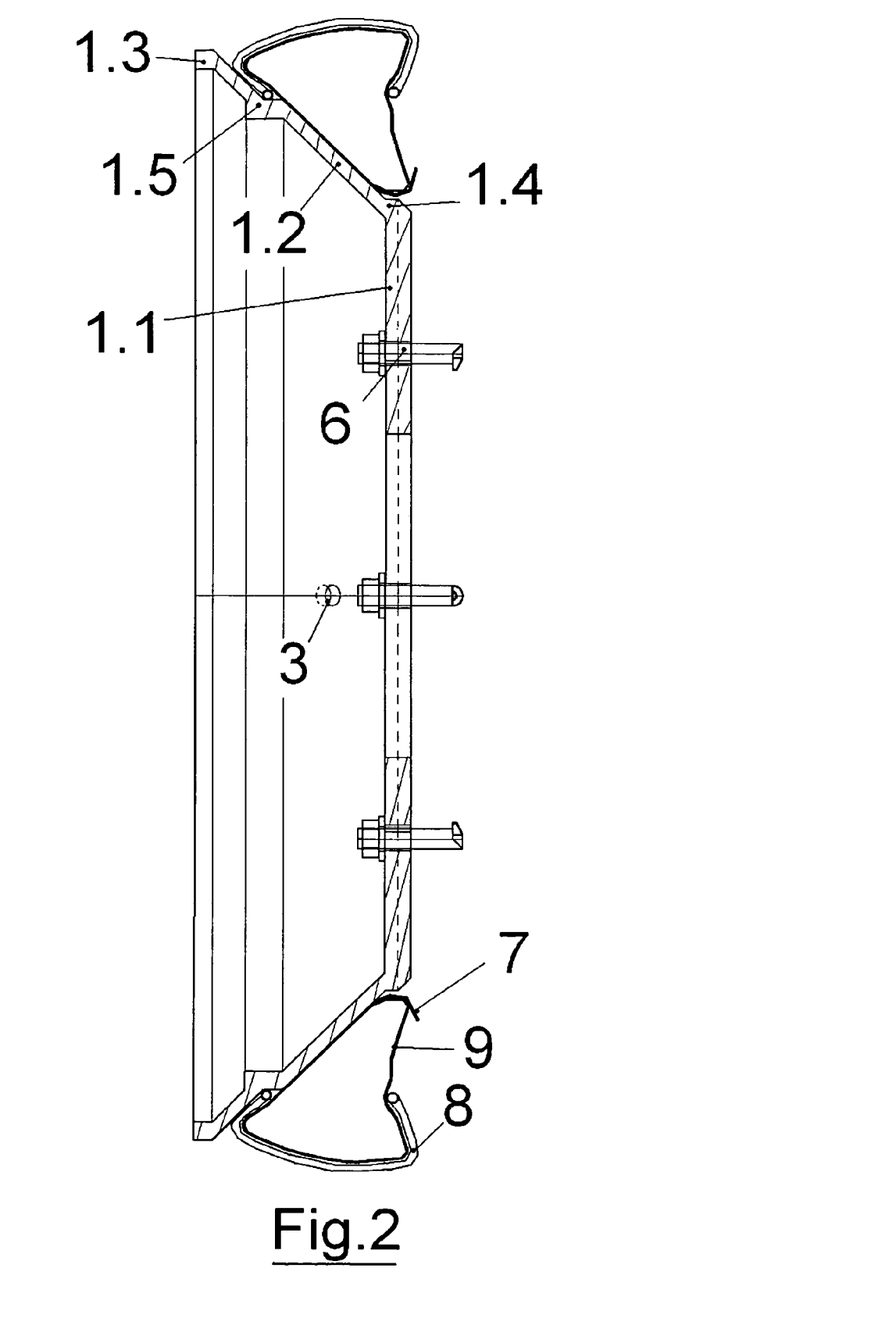
FIG. 2 is a section of a second embodiment of the anti-sink rim as it would be mounted on a wheel (not represented). The tread of this embodiment consists of the surface of a light tire (8).
Figure 3:
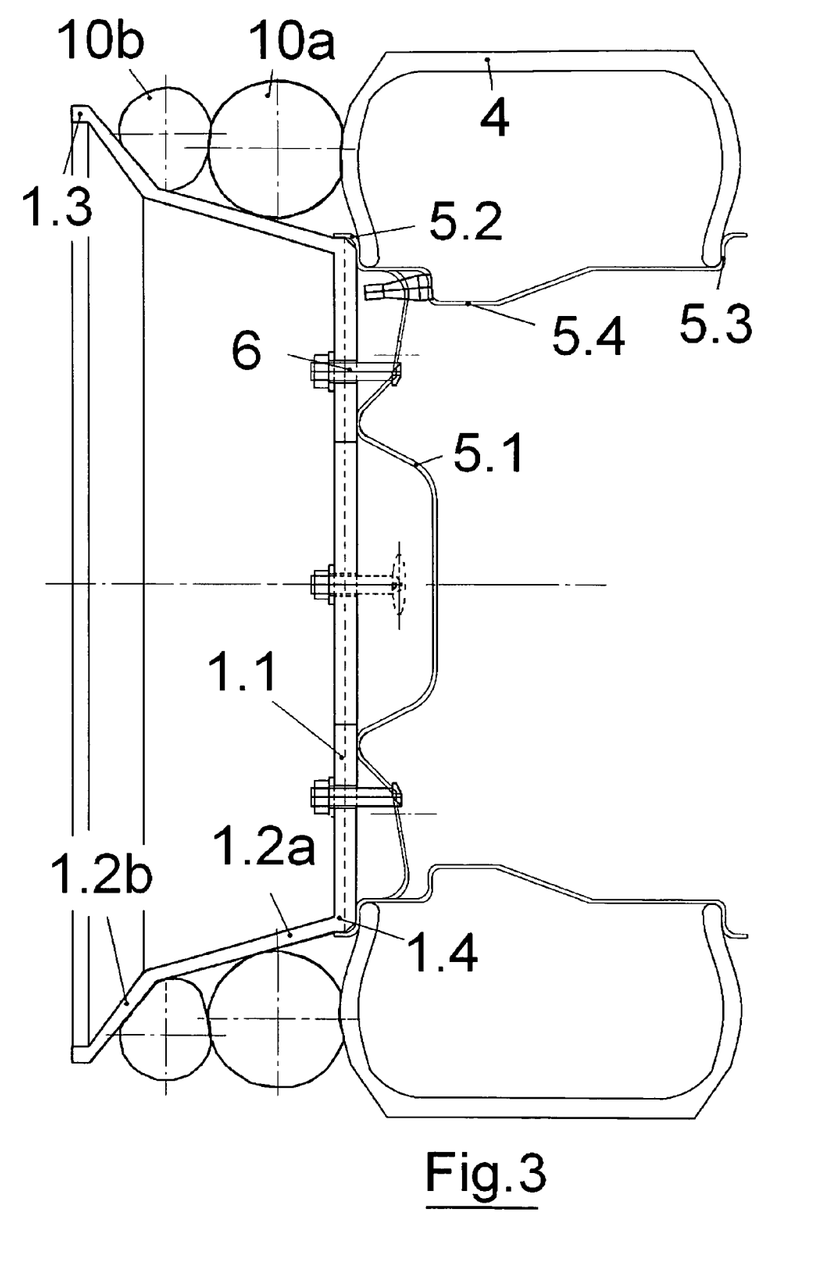
FIG. 3 is a section of a third embodiment of the anti-sink rim mounted on a wheel. The tread of this embodiment consists of the surface of 2 reinforced inflated tubes (10*a* and 10*b*).

In a second embodiment corresponding to FIG. 2, the material of the system tire is a regular tube (9) put inside a light tire (8). This tire similar to a mopped tire will be centered on a support (1.5) provided on the rim profile (1.2) on the outer side, and will be free on the vehicle side. The tube (9) inside pressure will guarantee enough friction at the bead wires and walls of the light tire (8) to transmit the required torque without twisting.

Any protuberance on the inside surface of the cone resulting from the shape of the support (1.5) will be smoothed so that it does not prevent stacking of the rims for minimized storage volume. In this drawing the centering of the anti-sink rim is made between the outside cylindrical part of the flange (1.4) and the rim edge (5.2), the rim conical profile (1.2) is reinforced (1.3), the inner tube (9) is protected from contact with the edge of the wheel rim by the protective tape (7).

With the third embodiment shown in FIG. 3, the anti-sink rim is widened. The shape of its profile (1.2) is here broken down into various sections (1.2a and 1.2b) with flare angles increasing in the outer direction in order to preserve a good ratio between width, stiffness and the possibility of stacking the rims one inside the other for optimized storage. The tread will be composed of several rings or reinforced tubes (10a and 10b). These kinds of rings ensure enough bearing capacity on many types of soil, including sand dunes.

Figure 4:
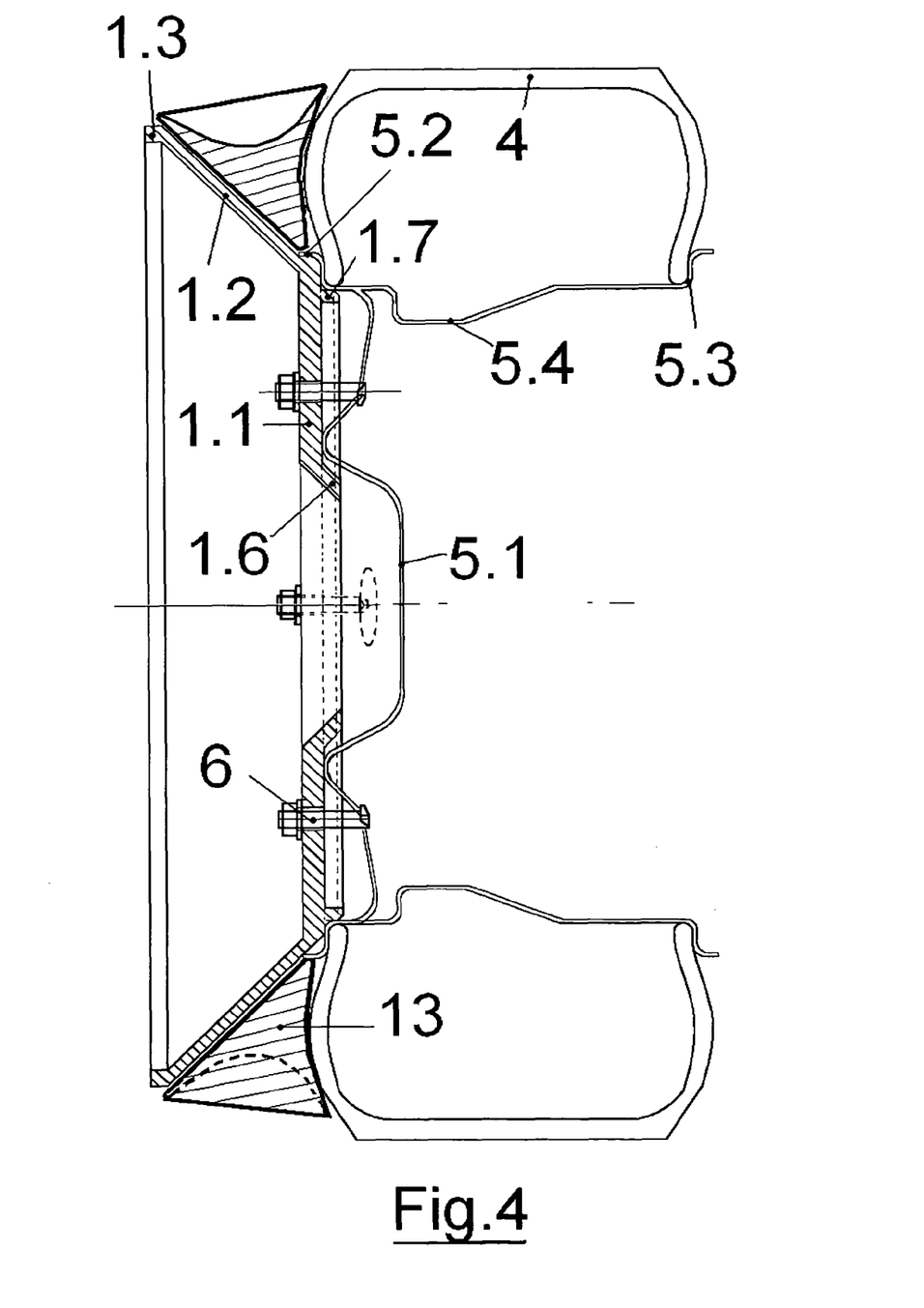
FIG. 4 is a section of a fourth embodiment of the anti-sink rim mounted on a wheel. The tread of this embodiment consists of the cup shaped surface of a cellular rubber bandage (13).

A fourth embodiment is shown in FIG. 4 with a cellular rubber solid tire (13) with cup shape studs as tire material. This tire presents a succession of cup shaped hollow caps on its tread. These shapes resemble prints of golf balls. The prints reduce the tire weight, and by trapping the sand they help contribute to the bearing capacity of the vehicle on sand tracks. The paddle effect of this surface also increases the global grip of the wheel on the sand. This drawing also shows another centering surface of the anti-sink rim between the cylindrical part (1.7) of the anti-sink rim flange and the inside corner of the wheel rim edge (5.2).

The central part of the flange (1.1) has been removed and the inside border (1.6) is folded in order to stiffen the flange. The conical profile (1.2) is provided with a reinforcement ring (1.3).

In a fifth embodiment shown in FIG. 5, the anti-sink rim centering is done by the inside cylindrical part (1.8) of a groove machined (or other manufacturing process) in the inner face of the flange (1.1) that fits around the outside diameter of the wheel rim edge (5.2).

This system is suited for commercial models of rims that do not have shoulders on their wheel discs. The contact in the axial direction is either at the level of this centering (1.8), or at the level of a plane contact between the anti sink rim face (1.1) and wheel disc (5.1).

The locking bolts (6) ending with hook (6.2) placed in the wheel disc openings insure the pressure of the flange on the wheel rim.

The tire is a solid tire made of compact rubber foam (14) that constitutes a puncture proof tread.

FIG. 6: represents a sixth embodiment similar to the one illustrated in FIG. 5, except for the solid tire (14) which is replaced by a solid tire with blades on its surface (15). The blades put on the outside of the light semi rigid compact material of the tire provide a paddle effect that add to the grip of the wheel tire (4) studs.

Figure 7:
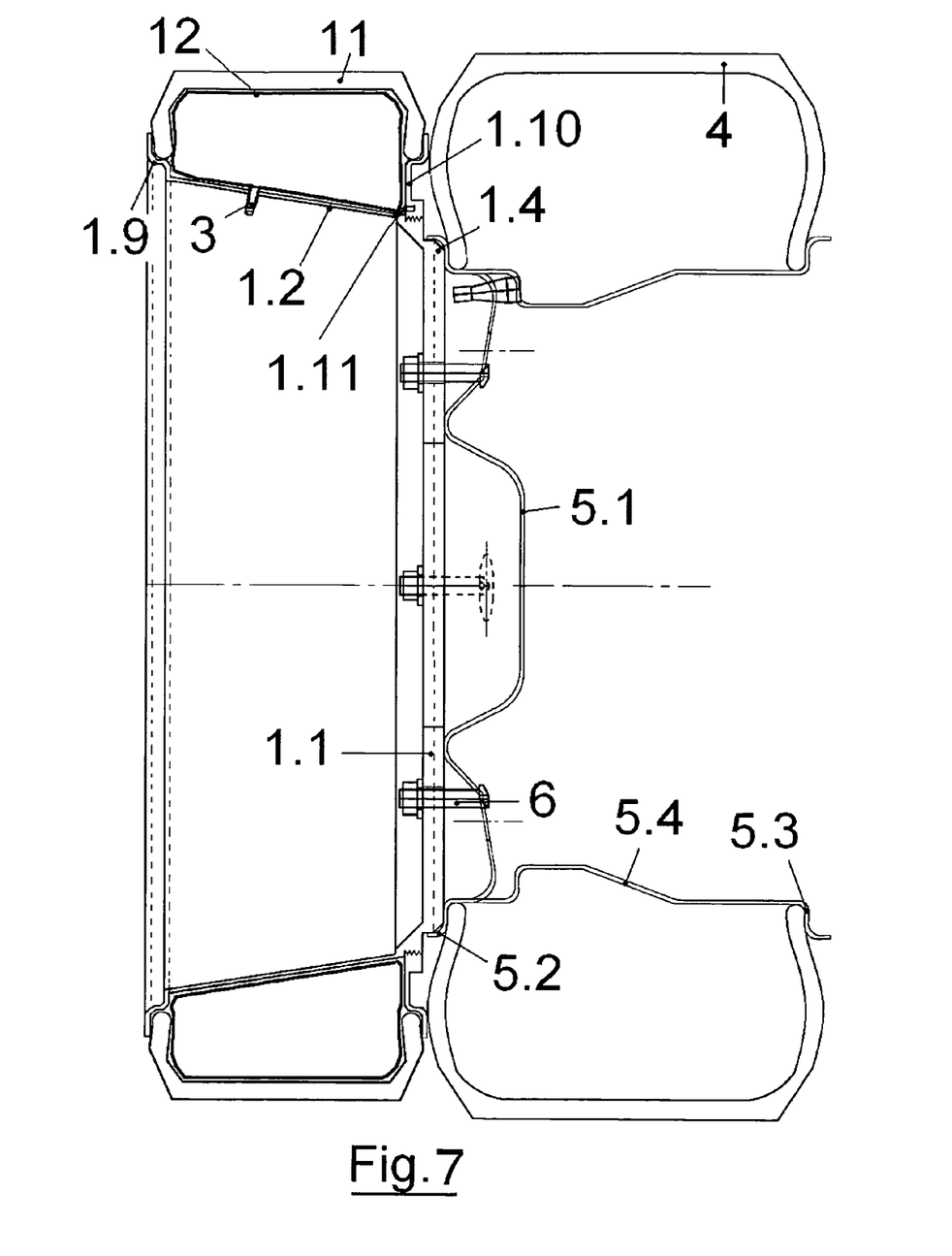
FIG. 7 is a section of a seventh embodiment of the anti-sink rim mounted on a wheel. The tread of this embodiment consists of the tread of a small wide ratio commercial tire.

According to a seventh embodiment, the anti-sink rim is widened to allow the mounting of a low ratio commercial tire. The flare angle of rim profile (1.2) is therefore minimal but still allows the stacking of several rims inside one another for reduced storage volume. The outer rim reinforcement (1.3) of the anti-sink rim is modified to form an outside flange (1.9) and bead seat for the new tire. On the vehicle side, the bead seat and tire flange are formed by the circumferential edge of an additional removable flange (1.10) that is mounted as an extension of the anti-sink rim flange (1.1). This new flange is generally removable so that stacking of the anti-sink rims inside one another remains possible, and to facilitate the mounting of the inner tube (12) and tire (11) on the rim profile. The inner tube (12) is inflated via a valve (3) that goes through a hole in the rim profile (1.2). In case the inside diameter of the flange (1.10) is threaded to be screwed on the threaded part of the rim profile (1.2), a pin (1.11) or another rotation locking system will be required. Because of the risk of leakage at the level of the screwed connection the use of the inner tube (12) in the tire (11) is preferred. In this configuration, the whole anti-sink rim is pre-assembled before it is mounted onto the vehicle wheel. FIG. 7 illustrates this embodiment combined with one possible centering system as shown in FIG. 1.

BEST MODE FOR CARRYING OUT THE INVENTION

The realization of different characteristic of the invention is carried out according to the information contained in each of the previous chapters.

Concerning a passenger car, the characteristics of the first embodiment are standard. Supposing the car wheel disc has 16 holes, 4 bolts with a single pin (6, 6.1, and 6.2) will be used. The anti-sink rim will be made of a stamped steel sheet 2 mm thick, doubled at the flange (1.1) level by another sheet welded on it. The wheel rim surfaces (5.1 and 5.2) being on the same plane, there is no need for a central part reinforcement (1.6) on the anti-sink rim flange. The outer rim reinforcement (1.3) will consist of a simple fold of the steel sheet at the edge of the rim profile (1.2). The protective tape (7) is a 2 mm thick and 20 mm wide rubber stripe with a circumference of 380 mm. The diameter of the anti-sink rim tube tread (2) is 550 mm at inflation pressure of 1.5 bars, and for a 600 mm wheel tire diameter (4). The width of the system is about 100 mm.

INDUSTRIAL APPLICABILITY

The system allows a car to access spaces normally reserved for specialized vehicles. It also allows vehicles specialized for driving on rugged terrain to increase their efficiency when they encounter occasional obstacles. This allows people to engage in ecological leisure activities that normally require buying or renting costs, and also to increase their safety and independence on isolated tracks by having the means to react efficiently when the vehicle is stuck. This however is not an alibi to venture out on any kind of track without other safety means.

The vehicle can easily be used with its regular wheels on small sections of regular roads without the necessity of dismantling the system because the regular vehicle wheel alone will negotiate the road due to its bigger diameter as compared to the anti-sink rim diameter. The system is universal, giving access to sandy, muddy, snowy etc. . . . tracks. It is however recommended to avoid rocky roads. The possibility of system elements interfering with car body can be decreased by adapting existing vehicles or specifically designing future models. In any case specific speed limitation must be followed.

What is claimed is:

1. An anti-sink rim system for a vehicle wheel for attachment to a wheel and tire assembly which is mounted to a vehicle, the anti-sink rim system comprising:
   a rim having a generally conical profile with an outer periphery and an inner portion joined to a support flange;

the rim further comprising a rim support intermediate the outer periphery and the support flange;

said support flange including openings therethrough which match and align with existing openings in a disk of the vehicle wheel, and including bolts which extend through the openings in the support flange and the existing openings to secure the support flange to the outer side of the vehicle wheel;

a tire mounted to the rim, said tire having an outer diameter that is smaller than the diameter of the vehicle tire, said tire having inner and outer beads;

an inner tube fitted inside of the tire such that a portion of the inner tube extends radially inward of the tire such that when the inner tube and tire are mounted to the conical profile of the rim the outer tire bead is seated on the rim support and a portion of the inner tube abuts the conical profile;

whereby when the anti-sink rim system is mounted to outer side of a wheel and tire assembly of a vehicle, the inner tire bead is disposed between and in contact with the inner tube and the vehicle tire, and a portion of the inner tube is disposed between and in contact with the conical profile and the vehicle tire.

2. Anti-sink rim system for a vehicle wheel for attachment to a wheel and tire assembly which is mounted to a vehicle, the anti-sink rim system comprising:

a rim having a generally conical profile with an outer periphery and an inner portion joined to a support flange; the rim further comprising a rim support intermediate the outer periphery and the support flange;

said support flange including openings therethrough which match and align with existing openings in a disk of the vehicle wheel, and including bolts which extend through the openings in the support flange and the existing openings to secure the support flange to the outer side of the vehicle wheel;

said support flange also comprising a first external cylindrical surface on a vehicle side for centering the system in relation to a corresponding cylindrical surface of the vehicle rim, and a second external threaded cylindrical surface on the side of the inner portion of the rim, an additional removable flange with a tapped inner cylindrical surface to be screwed on the threaded surface of the support flange, and a circumferential edge forming bead seat, a tire mounted to the rim, said tire having an outer diameter that is smaller than the diameter of the vehicle tire, said tire having inner and outer beads;

an inner tube with valve fitted inside of the Lire such that a portion of the inner tube extends radially inward of the tire such that when the inner tube and tire are mounted to the conical profile of the rim the outer tire bead is seated on the rim support, the inner tire bead is seated on the additional flange circumferential edge, and a portion of the inner tube abuts the conical profile and the additional flange surface.

3. Anti-sink rim system as claimed in claim 2 wherein the tire is a low ratio commercial tire.

* * * * *